June 20, 1944.  E. H. SMITH  2,351,787

TORCH TIP

Filed July 31, 1941

INVENTOR
ELMER H. SMITH
By Paul, Paul & Moore
ATTORNEYS

Patented June 20, 1944

2,351,787

UNITED STATES PATENT OFFICE 2,351,787

TORCH TIP

Elmer H. Smith, Minneapolis, Minn., assignor to Smith Welding Equipment Corporation, Minneapolis, Minn., a corporation of Minnesota Application July 31, 1941, Serial No. 404,849

1 Claim. (Cl. 158—27.4)

This invention relates to new and useful improvements in torch tips and more particularly to such tips adapted for burning hydro-carbon gases, such as propane, butane, and other gases of a similar character.

In the manufacture of torch tips for cutting purposes, it is important to arrange the preheating fuel orifices, which usually surround the central cutting gas passage, as close to the cutting gas passage as possible, in order that a highly concentrated preheating flame may be projected directly onto the surface area subsequently to be cut by the cutting flame. The cutting operation cannot be successfully started until the surface or area to be cut has been heated to a kindling temperature. It is now common practice to construct a cutting torch of two parts or members, one member fitting within the other member. The inner or core member usually has a central cutting gas passage extending the full length thereof, and a plurality of preheating fuel orifices are provided around the cutting passage at the tip of the torch. These preheating fuel orifices or ducts may be formed in various ways as disclosed in my Patent No. 2,215,019, issued September 17, 1940, and my Patent No. 2,254,757, granted to me on September 2, 1941.

Torch tips designed for burning hydro-carbon gases, such as propane, butane, and the like, must have the preheating fuel orifices at the tip of the torch disposed in close relation to the central or cutting gas passage, in order that the preheating fuel gas projected from the tip will be closely concentrated at the tip of the torch, whereby the area to be cut may be quickly heated to a kindling temperature before starting the cutting operation.

Heretofore, it has also been common practice to make the inner or core member of a metal, such as brass, which more readily lends itself to cutting or grooving than copper, it being almost impossible to mill or cut small slots or grooves in the periphery of a small copper core because of the inherent characteristics of such metal. Copper has a much higher melting point than brass and therefore is more desirable for use in the construction of torch tips. By making both the outer and inner members of copper, the coefficient of expansion of the two members will obviously be identical, and the walls of the two members may therefore be swaged into intimate and permanent contact in the formation of the tip, without danger of the joints between the two members loosening up.

In cutting tips designed for burning hydro-carbon gases, it is therefore highly desirable that the preheating fuel ducts be arranged in close relation to the central cutting gas passage, whereby the preheating flame may be projected therefrom and in such a manner as to form substantially a continuous wall of gas around the path of the cutting flame, whereby the preheating flame may be concentrated to a small area directly in line with the cutting flame, subsequently to be projected from the tip, when the metal has been heated to the proper temperature for cutting.

An object of the present invention therefore is to provide a cutting tip having the preheating fuel orifices at the cutting end of the tip disposed in close relation to the cutting gas passage, and the sides of said orifices towards the axis of the cutting gas passage being relatively wider than the wall portions circumferentially separating said orifices, whereby a highly concentrated preheating flame may be projected from the torch tip.

A further object is to provide a torch tip comprising an outer tubular member having a restricted bore at one end and an inner or core member being fitted within said tubular member and having a reduced cylindrical end portion fitting in said bore, the wall of said bore being provided with a plurality of substantially V-shaped longitudinally extending grooves having their wider sides disposed towards the center of the tip, whereby the preheating fuel flame projected from the tip will form substantially a continuous wall around the cutting gas passage or orifice.

A further object is to provide a torch tip comprising an outer tubular member having a restricted bore at one end whose wall is provided with a plurality of V-shaped grooves extending lengthwise of the bore and having their apexes pointing outwardly from the axis of the tip, in somewhat the formation of a star, whereby narrow, elongated ridges are provided between said grooves adapted to engage the periphery of the reduced end portion of the inner core member, which is fitted into the tubular member, and which inner member has a central cutting gas passage therein.

A further object is to provide a torch tip of the class described, comprising an outer tubular member having a restricted bore at one end formed with a plurality of longitudinally extending V-shaped grooves, by inserting a grooved mandrel in said bore and swaging the tubular member to force the metal constituting the wall of the restricted bore into the grooves in said mandrel, whereby the wall of said bore is provided with a plurality of V-shaped grooves separated by tooth-like ridges, and a core member having a longitudinally extending cutting gas passage therein being provided with a reduced cylindrical end portion adapted to be fitted into said grooved bore, after which the outer member is again swaged to force the ridges of the bore into intimate contact with the periphery of said reduced portion, whereby a plurality of preheating fuel gas orifices are provided which are disposed in relatively close relation to the cutting gas passage, and from which a highly concentrated preheating flame may be directed from the torch tip directly onto the area subsequently to be engaged by the cutting flame.

A further object is to provide a torch tip composed of an outer member having a core member fitted therein, and a plurality of fuel gas orifices being provided between said members at the cutting end of the tip, which are so constructed that the inner member may be made of copper, as well as the outer member, thereby providing a torch tip which is not likely to become damaged from extremely high temperatures, because an all copper tip has a relatively higher heat conducting capacity than tips made from a combination of copper and brass, as is now quite customary.

A further object is to provide a torch tip comprising outer and inner members, and the outer member having a restricted bore at one end provided with a plurality of V-shaped grooves having their wider open sides disposed towards the axis of the tip, whereby the reduced end portion of the inner or core member of the tip, when fitted into the grooved bore of the outer member, will provide the inner walls of the preheating orifices provided by the V-shaped grooves made in said bore, whereby the wall portions between the cutting gas passage of the core member and the preheating fuel ducts may be made extremely thin, whereby a highly concentrated preheating flame may be projected from the tip directly onto the area to be cut by the cutting flame subsequently to be projected from the tip, and whereby the tip may be practically and efficiently used for burning hydro-carbon gases, such as hereinbefore referred to.

A further object is to provide an improved method of making torch tips composed of an outer tubular member and an inner core member, which consists in providing a restricted bore in one end of the tubular member, placing a longitudinally grooved mandrel therein, and swaging one end of the outer member to force the wall of the restricted bore into the bottoms of the grooves of the mandrel, whereby said bore is provided with a plurality of longitudinally extending grooves, then removing the mandrel and inserting the cylindrical end portion of the core member into said grooved bore, and again swaging the tubular member to force the ridges separating the grooves in said bore into intimate contact with the periphery of the tubular member, whereby a plurality of preheating orifices are provided at the cutting end of the tip, which are disposed in close relation to the central cutting gas passage of the tip.

Other objects of the invention reside in the unique manner of forming the grooves in the wall of the restricted bore of the outer tubular member and fitting the reduced end portion of the core member into said bore, whereby the cylindrical wall of the cutting gas passage at the end of the tip, may be made comparatively thin, to thereby dispose the preheating fuel gas orifices in relatively close relation to the central cutting gas passage; in the arrangement of the grooves in the restricted bore of the tubular member, whereby the adjacent end of the core member may be relatively small in diameter, and whereby both the outer and inner members may be made of copper, thereby to provide an all copper tip; and, in the construction of such a tip which is simple and inexpensive in construction and which is particularly well suited for burning hydro-carbon gases.

Other objects of the invention will appear from the following description and accompanying drawing and will be pointed out in the annexed claim.

In the accompanying drawing there has been disclosed a structure designed to carry out the various objects of the invention, but it is to be understood that the invention is not confined to the exact features shown as various changes may be made within the scope of the claim which follows.

Figure 4:
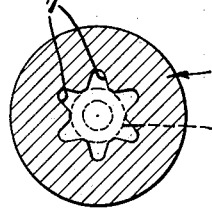
Figure 4 is an enlarged cross-sectional view on the line 4—4 of Figure 2.
Figure 6:
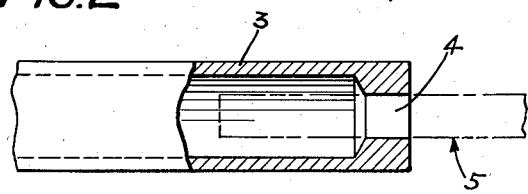
Figure 6 is a view showing the tubular blank from which the outer tubular member is formed.
Figure 8:
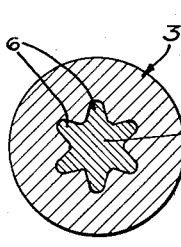
Figure 8 is an enlarged cross-sectional view on the line 8—8 of Figure 7.

The novel torch tip herein disclosed, is shown comprising an outer member 2 formed from a cylindrical tubular blank 3 having a restricted bore 4 at one end, as best shown in Figure 6. A suitable mandrel, generally designated by the numeral 5, is inserted into the bore 4 and is provided with a plurality of longitudinally extending ridges or ribs 6, as best shown in Figure 8. After the mandrel has been inserted into the bore 4, as shown in dotted lines in Figure 6, the end of the blank 3 is swaged to force the metal constituting the wall of the bore 4, into the longitudinal grooves provided between the ridges 6 of the mandrel 5, as best shown in Figure 8. The mandrel is subsequently removed, whereby the wall of the bore 4 will be shaped as shown in Figures 2 and 4, with a plurality of V-shaped grooves 7, having their wider sides facing inwardly towards the axis of the tip, as clearly illustrated in Figures 3 and 4.

Figure 1:
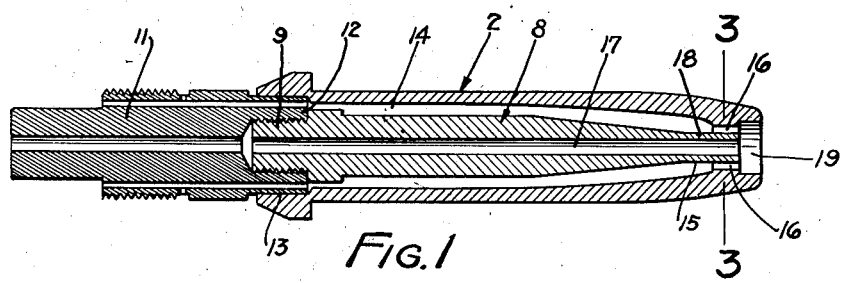
Figure 1 is a longitudinal sectional view showing the general construction of my improved tip.
Figure 2:
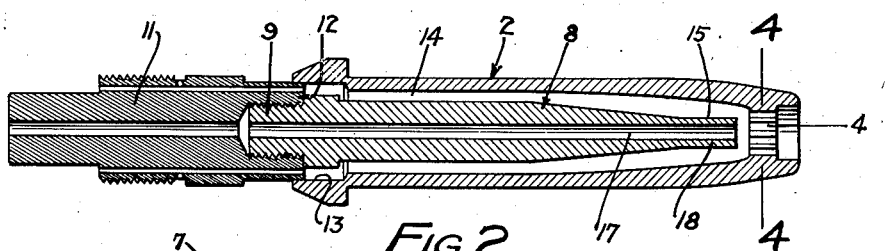
Figure 2 is a similar view with the outer tubular member only partially fitted onto the inner core member.

An inner core member, generally designated by the numeral 8, is formed as shown in Figures 1 and 2. The threaded end portion 9 of the core member 8 is adapted to be threaded into a socket provided in an end piece 11 having a cylindrical end portion 12 adapted to be received in a counter bore 13 provided in the tubular member 2, as best shown in Figure 2.

Figure 3:
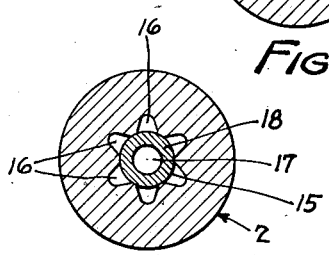
Figure 3 is an enlarged cross sectional view on the line 3—3 of Figure 1.
Figure 7:
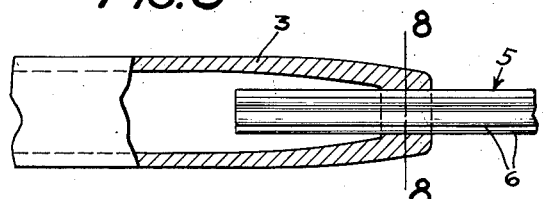
Figure 7 is a view showing the grooved mandrel inserted in the restricted bore provided at one end of the blank, and the latter swaged to force the metal of the restricted bore into the grooves of the mandrel.
Figure 5:
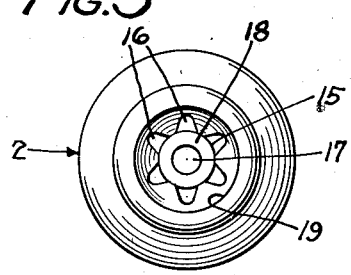
Figure 5 is an end view of the completed tip.

The core member 8 is relatively smaller in diameter than the inside diameter of the tubular member 2, thereby to provide an annular chamber 14 between the outer and inner members 2 and 8, as shown. The core member 8 has a reduced cylindrical end portion 15 adapted to be fitted into the grooved bore 4 of the tubular member 2, as shown in Figures 1 and 3, whereby the V-shaped grooves provided in the wall of the bore 4 become separated from one another to provide a plurality of preheating orifices 16, which are spaced apart equi-distant around a central cutting gas passage 17, provided in the core member 8.

Figure 9:
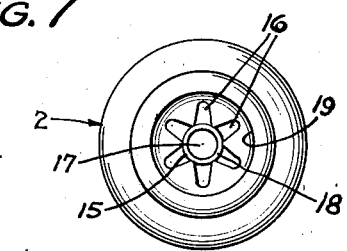
Figure 9 is a view similar to Figure 5, showing a slightly modified form of tip.

An important feature of the invention resides in forming the V-shaped grooves 7 in the wall of the bore 4, whereby the inner reduced end portion 15 of the core member need not be grooved or milled. By thus grooving the wall of the bore 4, the cylindrical wall 18 of the cutting gas passage 17, at the reduced end portion 15 of the core member 8, may be made extremely thin, as shown, for example in Figure 9, whereby when the core member 8 is fitted into the grooved bore 4, the inner walls of the V-shaped orifices 16 are disposed in relatively close relation to the cutting gas passage 17, so that when a preheating fuel gas is projected from the torch tip, such fuel gas will form substantially a continuous cylindrical wall around the cutting gas passage 17 which, when ignited, will produce a highly concentrated preheating flame which will impinge directly against the area of the metal to be cut, whereby the metal may be quickly heated to a kindling temperature, which is essential before the cutting operation can be successfully started.

By grooving the wall of the bore 4, as herein disclosed, the core member need not be grooved, whereby it may be made of copper, and whereby the entire torch tip, with the exception of the end piece 11, may be made of copper. This is advantageous in that an all copper tip will conduct off the heat more quickly than a tip which is partially composed of brass or some other metal of low heat conductivity. Also, by making the entire tip of copper, the outside diameter of the tip may, if desired, be made relatively smaller, which is desirable in tips to be used for cutting small rivets or cutting in close places.

From actual experience, I have found that by constructing the preheating fuel gas orifices as herein disclosed, the wall 18 of the core member 8 may be made to paper thickness, if desired, without danger of said wall melting or becoming distorted from excessive heat. This results because the inner member is made of copper which has a much higher melting point than brass, or other such metals. The end of the tip is shown provided with a counterbore 19, as is customary in tips of this general character.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

A torch tip comprising an outer tubular member having a restricted bore in one end, an inner member fitted within said tubular member and having a reduced cylindrical end portion fitting in said restricted bore, said inner member having a longitudinally disposed cutting gas passage therein, and the wall of said restricted bore having a plurality of V-shaped grooves therein, the wider sides of which are defined by the periphery of the reduced portion of said inner member fitting in said bore, said V-shaped grooves being parallel to and encircling said cutting gas passage and cooperating to provide a plurality of preheating fuel orifices from which a concentrated preheating flame may be projected.

ELMER H. SMITH.